United States Patent
Mita et al.

(12)

(10) Patent No.: US 6,433,661 B1
(45) Date of Patent: Aug. 13, 2002

(54) MAGNETIC-FIELD THERMAL TREATMENT APPARATUS CAPABLE OF REDUCING WEIGHT AND UTILITY CONSUMPTION THEREOF

(75) Inventors: Junichi Mita, Saitama; Kazuhito Yamamoto; Hiroto Ueno, both of Tokyo, all of (JP)

(73) Assignees: Sumitomo Heavy Industries, Ltd., Tokyo; Futek Furnace Inc., Kanagawa, both of (JP)

( * ) Notice: Subject to any disclaimer, the term of this patent is extended or adjusted under 35 U.S.C. 154(b) by 0 days.

(21) Appl. No.: 09/666,860

(22) Filed: Sep. 21, 2000

(30) Foreign Application Priority Data

Sep. 28, 1999 (JP) .......................................... 11-273659

(51) Int. Cl.⁷ ............................ C30B 35/00; H01F 6/00
(52) U.S. Cl. ....................................... 335/216; 117/917
(58) Field of Search .................. 335/216; 336/DIG. 1; 505/879, 880; 117/200, 208, 218, 32, 917

(56) References Cited

U.S. PATENT DOCUMENTS 4,592,895 A  *  6/1986  Matsutani et al. .......... 422/108
4,830,703 A  *  5/1989  Matsutani ................. 156/617.1
5,980,630 A  * 11/1999  Iino et al. ...................... 117/32

FOREIGN PATENT DOCUMENTS

| JP | 63-53469 | 10/1988 |
| JP | 10-222815 | 8/1998 |
| JP | 2000-114028 | 4/2000 |

* cited by examiner

Primary Examiner—Ramon M. Barrera
(74) Attorney, Agent, or Firm—Arent Fox Kintner Plotkin & Kahn (57) ABSTRACT

A magnetic-field thermal treatment apparatus is used to carry out a thermal treatment for plural substrates, which are placed in a vacuum chamber, as a magnetic field is applied to the substrates. Around the vacuum chamber, a heater and a solenoid type cryocooler-cooled superconductive magnet unit as a magnetic field generating unit are provided. The substrates held in a substrate holder are retained in the interior of the vacuum chamber so that the surfaces of the substrates become parallel to one another in a vertical direction. The superconductive magnet unit has at least one superconductive coil surrounding the vacuum chamber horizontally so as to exert the magnetic field, which is parallel to the surfaces of the substrates, on the substrates.

4 Claims, 6 Drawing Sheets

MAGNETIC-FIELD THERMAL TREATMENT APPARATUS CAPABLE OF REDUCING WEIGHT AND UTILITY CONSUMPTION THEREOF

BACKGROUND OF THE INVENTION

This invention relates to a magnetic-field thermal treatment apparatus adapted to thermally treat an object member, which is placed in a depressurized chamber, especially, a vacuum chamber, as a magnetic field is applied to the object member.

The known magnetic-field thermal treatment apparatuses of this kind include a treatment apparatus for manufacturing, for example, magnetic resistance effect type heads. Recently, a read head called a giant magnetic resistance effect head (GMR head) has been proposed, and such a read head manufacturing thermal treatment apparatus as mentioned above has been provided since it is necessary in the read head manufacturing process to thermally treat a material for the read head as a magnetic field is applied thereto. A method of manufacturing giant magnetic resistance effect heads is disclosed in, for example, Japanese Patent Laid-Open (JP-A) No. 222815/1998.

A related art magnetic-field thermal treatment apparatus used for such a method of manufacturing giant magnetic resistance heads uses a regular electromagnet unit as a magnetic field generating unit. When an electromagnet unit is used for this purpose, the dimensions thereof have to be very large so as to obtain a required magnetic field. When a large electromagnet unit is used, the weight of a magnetic-field thermal treatment apparatus becomes very large. In such a case, it is necessary to secure a load resistance of a floor on which the magnetic-field thermal treatment apparatus is set, and this causes the expense of cost on a building for housing the apparatus to increase, and a place in which the apparatus is installed to be limited. Since a regular electromagnet unit has a large electric power consumption and generates a large quantity of heat, the quantity of water supplied to a cooling system becomes large to cause the running cost to increase. Moreover, in a regular electromagnet unit, there is a limit (1.5 T at the highest) to a generated magnetic field intensity. The results of recent researches into the techniques relating to such an apparatus have made it clear that applying a large magnetic field is effective in improving and stabilizing a magnetic resistance effect of a giant magnetic resistance effect head.

The weight of a body of a magnetic-field thermal treatment apparatus (effective thermal treatment range: diameter φ=152 mm, length=100 mm, magnetic field intensity=1.5 T) using a related art electromagnet unit is about 7000 kg. It is said that the power source capacity and the quantity of cooling water of necessity are 200 V, 190 kVA and 100 liter/min, respectively.

SUMMARY OF THE INVENTION

The present invention has been made in view of the above-mentioned circumstances, and provides a magnetic-field thermal treatment apparatus capable of attaining the reduction of the weight thereof.

The present invention also provides a magnetic-field thermal treatment apparatus capable of attaining the reduction of consumption of utilities, such as electric power and cooling water.

The present invention further provides a magnetic-field thermal treatment apparatus capable of attaining an increase in the generated magnetic field intensity.

The present invention is applied to a magnetic-field thermal treatment apparatus adapted to carry out a thermal treatment for an object member, which is placed in a depressurized chamber, as a magnetic field is applied to the member. The magnetic-field thermal treatment apparatus according to the present invention is characterized in that a heater is provided around the chamber with a superconductive magnet unit provided as a magnetic field generating unit.

According to an aspect of the present invention, the magnetic-field thermal treatment apparatus holds in a depressurized chamber object members formed of plural sheets of substrate-like members held in a substrate holder and retained in the chamber so that the surfaces of the substrate-like members become horizontal. The superconductive magnet unit has at least a pair of superconductive coils provided in a vertically opposed state with the chamber positioned therebetween, so as to exert a magnetic field, which is parallel to the surfaces of the object substrate-like members, on the same object substrate-like members.

According to another aspect of the present invention, the magnetic-field thermal treatment apparatus holds in a depressurized chamber object members formed of plural sheets of substrate-like members held in a substrate holder and retained in the chamber so that the surfaces of the substrate-like members become parallel to one another in the lateral direction. The superconductive magnet unit has at least one superconductive coil surrounding the chamber horizontally, so as to exert a magnetic field, which is parallel to the surfaces of the object substrate-like members, on the same object substrate-like members.

DESCRIPTION OF THE PREFERRED EMBODIMENTS

Figure 1:
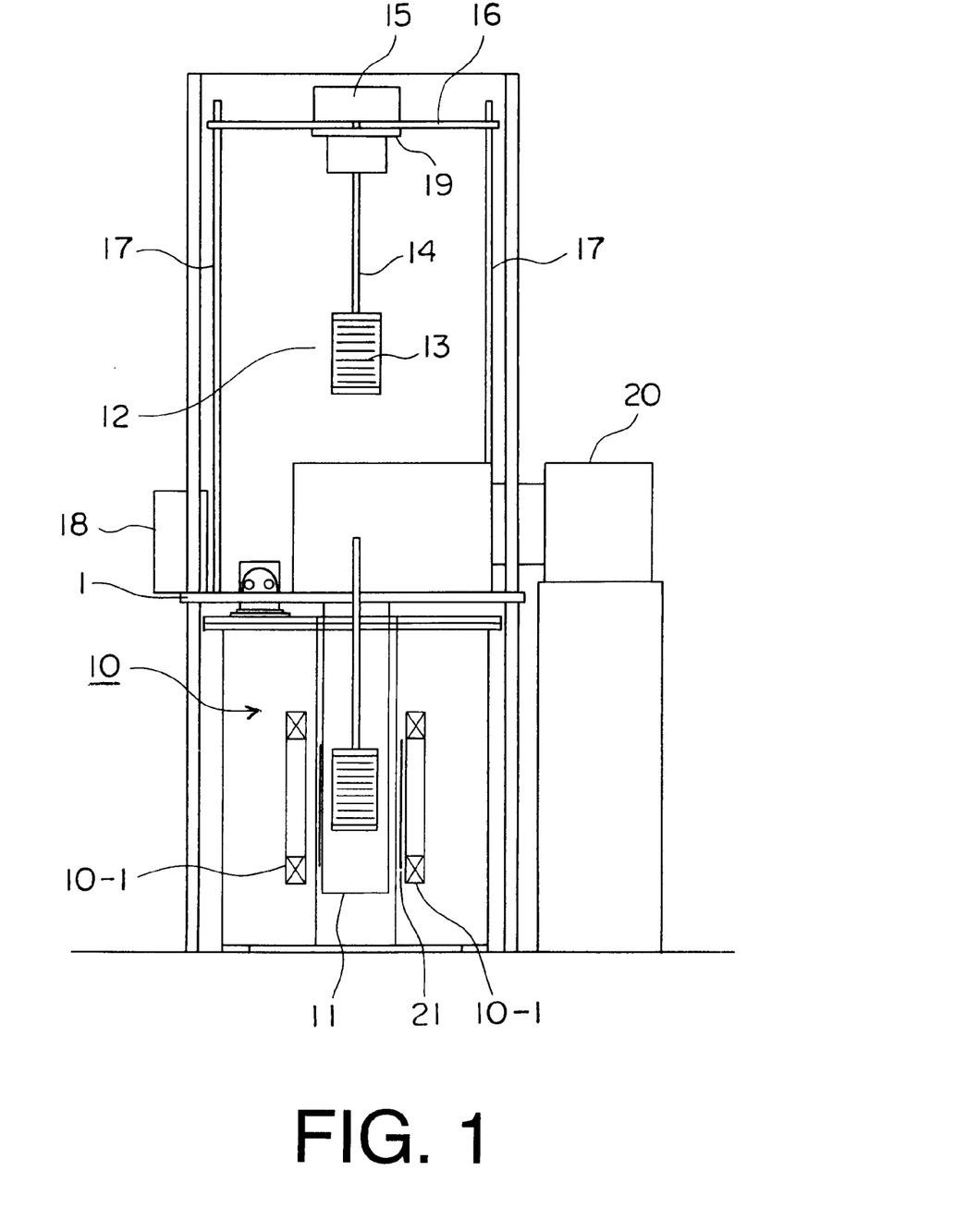
FIG. 1 is a drawing showing the schematic construction of a first embodiment of a magnetic-field thermal treatment apparatus according to the present invention.

A first embodiment of a magnetic-field thermal treatment apparatus according to the present invention will be described with reference to FIG. 1. This apparatus is used mainly for a process for manufacturing magnetic resistance effect type heads. Referring to FIG. 1, a vacuum chamber 11 formed of a silica tube is provided in a bore of a superconductive magnet unit 10 via a bridge frame 1. The vacuum chamber 11 is provided in the interior thereof with plural pieces of circular substrates 13 held in a substrate holder 12. On the substrates 13, a magnetic resistance effect type head material is vapor deposited. The substrates 13 are held in the substrate holder 12 so that a principal plane thereof becomes parallel to magnetic field generated by the superconductive magnet unit 10. Namely, in this embodiment, a pair of superconductive coils 10-1 constituting the superconductive magnet unit 10 are disposed vertically in an opposed state with the vacuum chamber 11 therebetween, in such a manner that a magnetic field works in the horizontal direction in the vacuum chamber 11. The substrates 13 are retained so that a principal plane thereof becomes horizontal. Such a superconductive magnet unit 10 is used to form a lateral magnetic field, and called a Helmholtz' superconductive magnet unit. Although the superconductive magnet unit 10 of FIG. 1 shows only the superconductive coils 10-1 symbolically, various kinds of superconductive magnet units have been provided. Therefore, a detailed description of the construction of the superconductive magnet unit is omitted in this embodiment.

The substrate holder 12 is fixed to a lower end portion of a rotary shaft 14. The rotary shaft 14 is drawn out to the exterior of the vacuum chamber 11, and connected to a rotary unit 15 adapted to rotate the rotary shaft 14. The rotary unit 15 is formed of a motor practically. The rotary unit 15 is fixed to a support frame 16. The support frame 16 is screwed at both side portions thereof on screw shafts 17 via ball screw mechanisms (not shown). The two screw shafts 17 are rendered rotatable by a drive unit 18 via a chain (not shown) or other connecting mechanism (not shown). When the two screw shafts 17 are rotated, the support frame 16 becomes vertically movable by the ball screw mechanisms. Namely, the ball screw mechanisms, the screw shafts 17 and the drive unit 18 constitute a drive mechanism 15 for vertically moving the substrate holder 12.

The vacuum chamber 11 is provided with an opening at an upper end portion thereof. This opening is formed so as to enable the substrate holder 12 to be drawn out of and into the vacuum chamber 11 in accordance with the vertical movements of the substrate holder 12, and has to be covered up. To meet the requirement, the portion of the support frame 16 which is just under the rotary unit 15 is provided with a cover member 19. The cover member 19 is formed so that the opening of the vacuum chamber 11 can be closed therewith when the substrate holder 12 reaches a predetermined position (position shown by one-dot chain lines in FIG. 1) in the interior of the vacuum chamber 11 by a downward movement of the support frame 16.

The vacuum chamber 11 is connected to a vacuum pumping unit 20. Around the vacuum chamber 11, a heater 21 is provided.

In such a structure, a thermal treatment for the substrates 13 is carried out as follows. First, plural sheets of substrates 13 are set in the substrate holder 12. The support frame 16 is then moved downward to position the substrate holder 12 in the interior of the vacuum chamber 11 and close the opening of the vacuum chamber 11 with the cover member 19. The vacuum pumping unit 20 is then started to make vacuous the interior of the vacuum chamber 11. When the interior of the vacuum chamber 11 attains a predetermined depressurized condition, an electric current is applied to the heater 21 to heat the substrates with the magnetic field also applied thereto by the superconductive magnet unit 10. When occasion calls, an angle of the magnetic field working on the substrates 13 is varied by turning the substrates 13 by the rotary unit 15. When the thermal treatment finishes, the interior of the vacuum chamber 11 is released from the depressurized condition. The substrate holder 12 is thereafter taken out of the vacuum chamber 11 by upwardly moving the support frame 16. The treated substrates 13 are replaced with untreated substrates 13, and the above-mentioned operations are repeated.

The magnetic-field thermal treatment apparatus using the cryocooler-cooled superconductive magnet unit 10 has weight of an apparatus body of about 2,500 kg (about ⅓ of that of a body of such an apparatus using a regular electromagnet unit), an amount of electric power to be used of 200 V, 25 kVA (about ⅛ of that in such an apparatus using a regular electromagnet unit) and an amount of cooling water to be used of 28 liter/min (about ¼ of that in such an apparatus using a regular electromagnet unit). To secure the uniformity of the characteristics of a raw material, for example, aluminum nitride for a magnetic resistance effect type head, the following accuracy can be attained. The generated magnetic field intensity of up to about 3 T can be attained (effective thermal treatment range: diameter $\phi$=within 200 mm, length L=within 200 mm). Concerning the magnetic field accuracy, the attainable uniformity of the magnetic field is within ±2% (in the effective thermal treatment range), and an attainable angle of skew back within 1° (in the effective thermal treatment range). The effective thermal treatment intervals are 150–350 mm.

Figure 2:
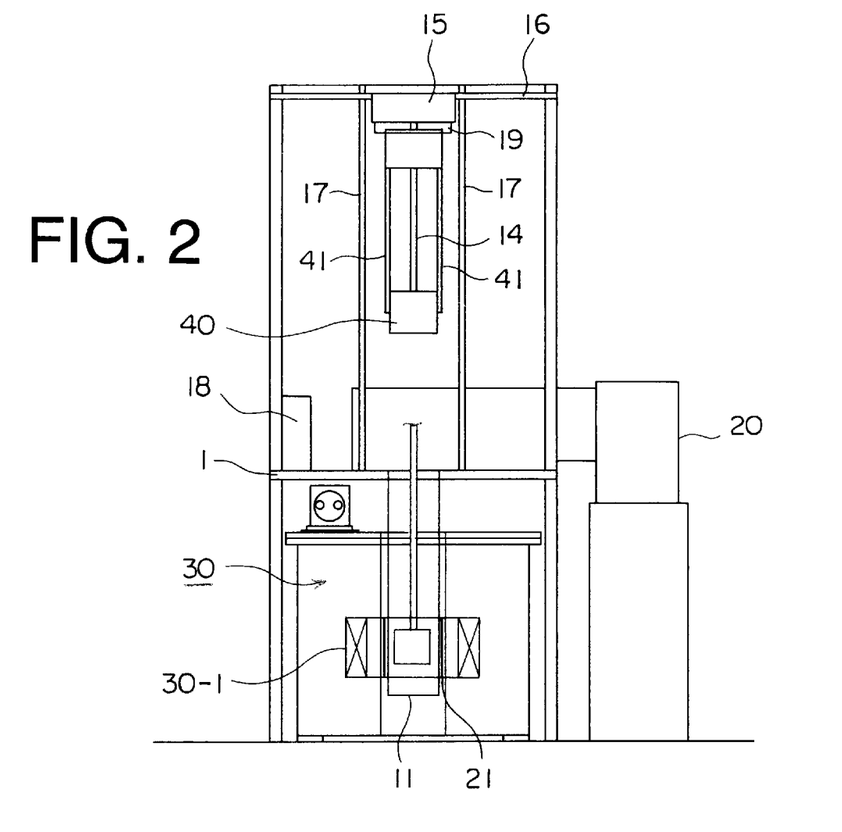
FIG. 2 is a drawing showing the schematic construction of a second embodiment of the magnetic-field thermal treatment apparatus according to the present invention.

A second embodiment of the magnetic-field thermal treatment apparatus according to the present invention will now be described with reference to FIGS. 2 and 3. The structural elements identical with those of the first embodiment shown in FIG. 1 are designated by the same reference numerals. The apparatus in the second embodiment is also used mainly for a process for manufacturing magnetic resistance effect type heads. Referring to FIG. 2, the vacuum chamber 11 formed of a silica tube is provided in a bore of a superconductive magnet unit 30 via the bridge frame 1. The vacuum chamber 11 is provided therein with plural pieces of circular substrates 13 held in a substrate holder 40. On the substrates 13, the magnetic resistance effect type head material is vapor deposited. The substrates 13 are held in parallel with one another in a vertical direction, i.e., in a vertically standing state in the substrate holder 40 so that a principal plane of the substrates becomes parallel to a magnetic field generated by the superconductive magnet unit 30. Namely, in this embodiment, a superconductive coil 30-1 constituting the superconductive magnet unit 30 is provided horizontally so as to surround the vacuum chamber 11 so that the superconductive coil generates the magnetic field in the vertical direction. The substrates 13 are held so that the principal plane thereof becomes vertical. Such a supercoductive magnet unit 30 is used to form a vertical magnetic field, and called a solenoid type superconductive magnet unit. Although the superconductive magnet unit 30 in this embodiment shows also the superconductive coil 30-1 alone symbolically in FIG. 2, various superconductive magnet units have been provided. For example, the applicant of the present invention has proposed a refrigerant cooling type superconductive magnet unit (Japanese Patent Laid-Open (JP-A) No. 114028/2000) for a monocrystal pulling apparatus. In this embodiment, such a superconductive magnet unit can also be used. A detailed description of the construction of the superconductive magnet unit is also omitted in this embodiment.

Figure 3:
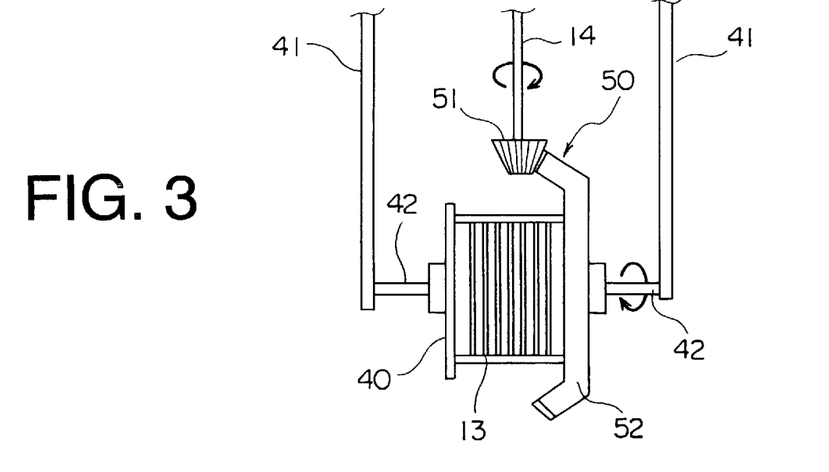
FIG. 3 is a drawing showing an example of a rotation conversion mechanism combined with a substrate holder shown in FIG. 2.

As shown in FIG. 3, the substrate holder 40 is supported on horizontal shafts 42 in the vacuum chamber 11 via two support members 41 so that the substrate holder 40 can be rotated around the horizontal shafts 42. The horizontal shafts 42 are rotatably supported on the two support members 41.

Between the substrate holder 40 and a lower end portion of a rotary shaft 14, a conversion mechanism 50 is provided which is adapted to convert the rotational movement of the rotary shaft 14 into that around the horizontal shafts 42 of the substrate holder 40. The conversion mechanism 50 includes a bevel gear 51 fixed to a lower end portion of the rotary shaft 14, and a crown gear 52 fixed to one end portion of the substrate holder 40. Such a conversion mechanism constitutes a mere example, and various other modes of conversion mechanisms can be attained by using other known mechanisms. For example, the transmission of a rotational movement can be effected by using a worm gear or a steel belt.

The rotary shaft 14 is drawn out to the exterior of the vacuum chamber 11, and connected to the rotary unit 15 used to rotate the rotary shaft 14. The rotary unit 15 can be formed of a motor. The rotary unit 15 is fixed to the support frame 16. The support frame 16 is screwed at both side portions thereof to the screw shafts 17 via the ball screw mechanisms (not shown). The two screw shafts 17 are rendered rotatable by the drive unit 18 via a chain or other connecting mechanism. When the two screw shafts 17 are rotated, the support frame 16 is rendered vertically movable by the ball screw mechanism.

As described above with reference to FIG. 1, the vacuum chamber 11 is provided at an upper end portion thereof with an opening, and the cover member 19 on the portion of the support frame 16 which is just under the rotary unit 15. The cover member 19 is formed so that the opening of the vacuum chamber 11 can be closed therewith when the substrate holder 40 is set in a predetermined position (shown by one-dot chain lines in FIG. 2) in the interior of the vacuum chamber 11 by a downward movement of the support frame 16.

The vacuum chamber 11 is connected to the vacuum pumping unit 20. Around the vacuum chamber 11, the heater 21 is provided.

In such a structure, a thermal treatment for the substrates 13 is carried out as follows. First, plural sheets of substrates 13 are set in the substrate holder 40. The support frame 16 is then moved down so as to position the substrate holder 40 in the interior of the vacuum chamber 11 and close the opening of the vacuum chamber 11 with the cover member 19. The vacuum pumping unit 20 is then started to make vacuous the interior of the vacuum chamber 11. When the interior of the vacuum chamber 11 attains a predetermined depressurized condition, an electric current is applied to the heater 21 to heat the substrates with the magnetic field also applied thereto by the superconductive magnet unit 30. When occasion calls, an angle of the magnetic field working on the substrates 13 is varied by turning the substrates 13 by the rotary unit 15 and the conversion mechanism 50. When the thermal treatment finishes, the interior of the vacuum chamber 11 is released from the depressurized condition. The substrate holder 40 is thereafter taken out of the vacuum chamber 11 by upwardly moving the support frame 16. The treated substrates 13 are replaced with untreated substrates 13, and the above-mentioned operations are repeated.

Although the superconductive magnet unit 30 of FIG. 2 is provided with one superconductive coil 30-1, two superconductive coils may be provided in a vertically spaced manner. In such a case, a mechanism capable of varying the distance between the two superconductive coils may be provided. An example of such a case will be described later.

Figure 4A:
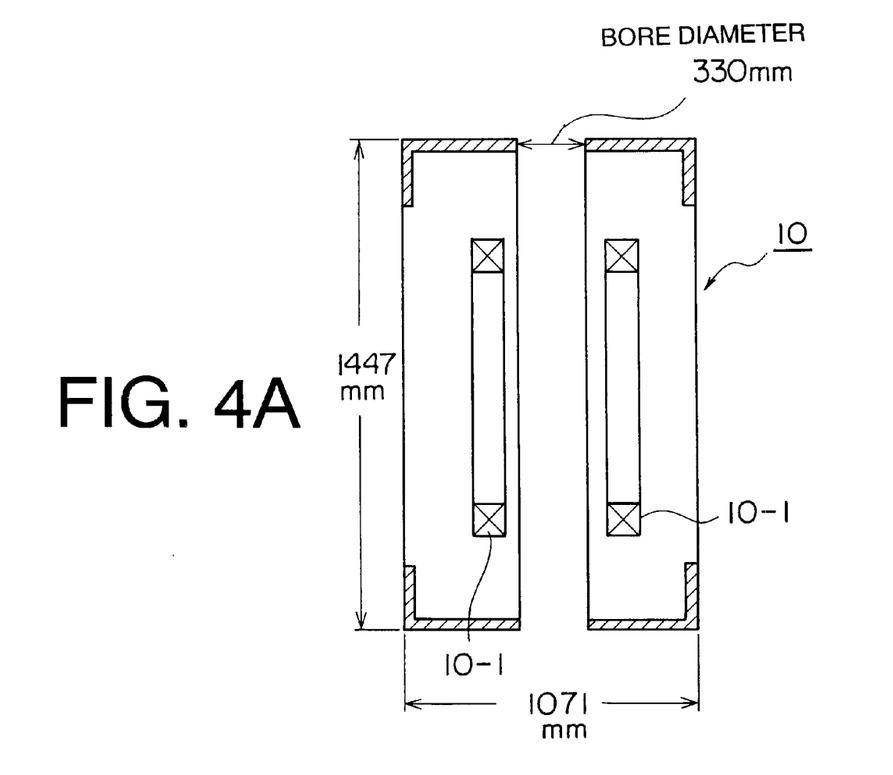
FIGS. 4A and 4B are drawings illustrating comparatively the sizes of the apparatuses of the first and second embodiments shown in FIGS. 1 and 2, respectively.
Figure 4B:
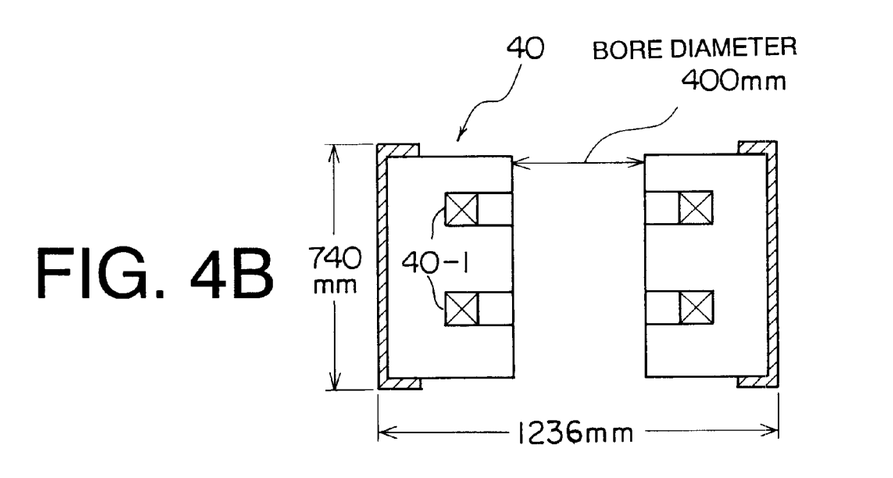

The sizes of the superconductive magnet units in the first and second embodiments will be compared with each other with reference to FIGS. 4A and 4B. FIG. 4A shows the superconductive magnet unit called a Helmholtz' superconductive magnet unit in the first embodiment, and FIG. 4B shows the superconductive magnet unit called a solenoid type superconductive magnet unit in the second embodiment. On the assumption that the magnetic field intensity, uniformity of the magnetic field, angle of skew back and leakage magnetic field intensity of the two magnet units are equal, the vertical size of the solenoid type superconductive magnet unit can be reduced to about a half of that of the Helmholtz' superconductive magnet unit. Since the magnetic-field thermal treatment apparatus according to the present invention is installed in a clean room in many cases, there are limits to the height and weight thereof. In the case of the solenoid type apparatus, its capability of reducing the height to a low level constitutes a great advantage in installing the apparatus in the clean room.

According to the second embodiment, the use of the solenoid type cryocooler-cooled superconductive magnet unit causes the magnetic-field thermal treatment apparatus to become more compact than the use of the Helmholtz' cryocooler-cooled superconductive magnet unit. The magnetic-field thermal treatment apparatus using the solenoid type superconductive magnet unit 30 has weight of an apparatus body of about 1,800 kg (about ¼ of that of a body of such an apparatus using a regular electromagnet unit), an amount of electric power to be used of 200 V, 25 kVA (about ⅛ of that in such an apparatus using a regular electromagnet) and an amount of cooling water to be used of 28 liter/min (about ¼ of that in such an apparatus using a regular electromagnet unit). The attainable generated magnetic field intensity is up to about 5 T (effective thermal treatment range: diameter $\phi$=within 200 mm, length L=within 200 mm). Concerning the magnetic field accuracy, the attainable uniformity of the magnetic field is within ±2% (in the effective thermal treatment range), and attainable angle of skew back within 1° (in the effective thermal treatment range). The diameter at room temperature of a bore of the superconductive magnet unit is 200–500 mm.

Figure 5:
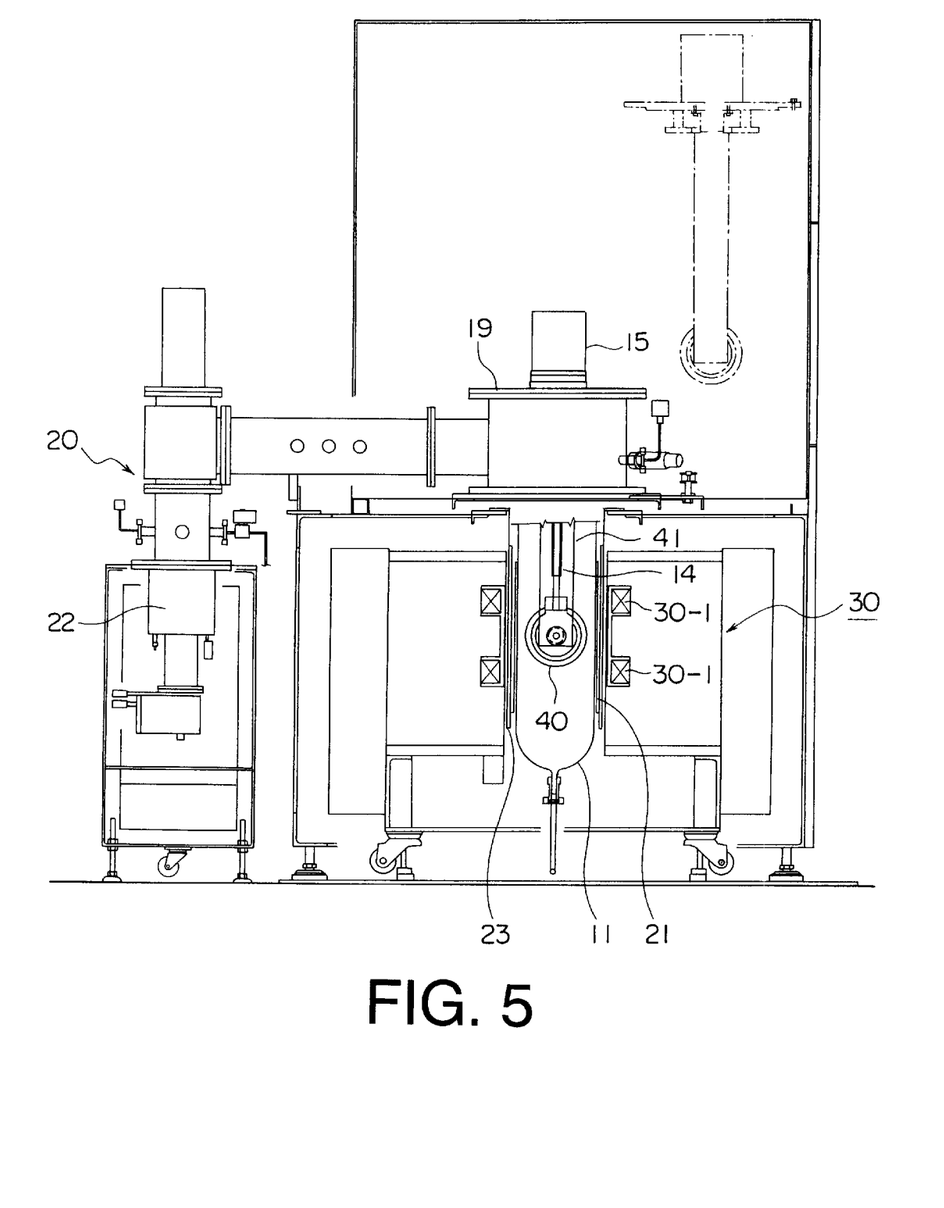
FIG. 5 is a drawing showing the detailed construction of the magnetic-field thermal treatment apparatus shown in FIG. 2.
Figure 6:
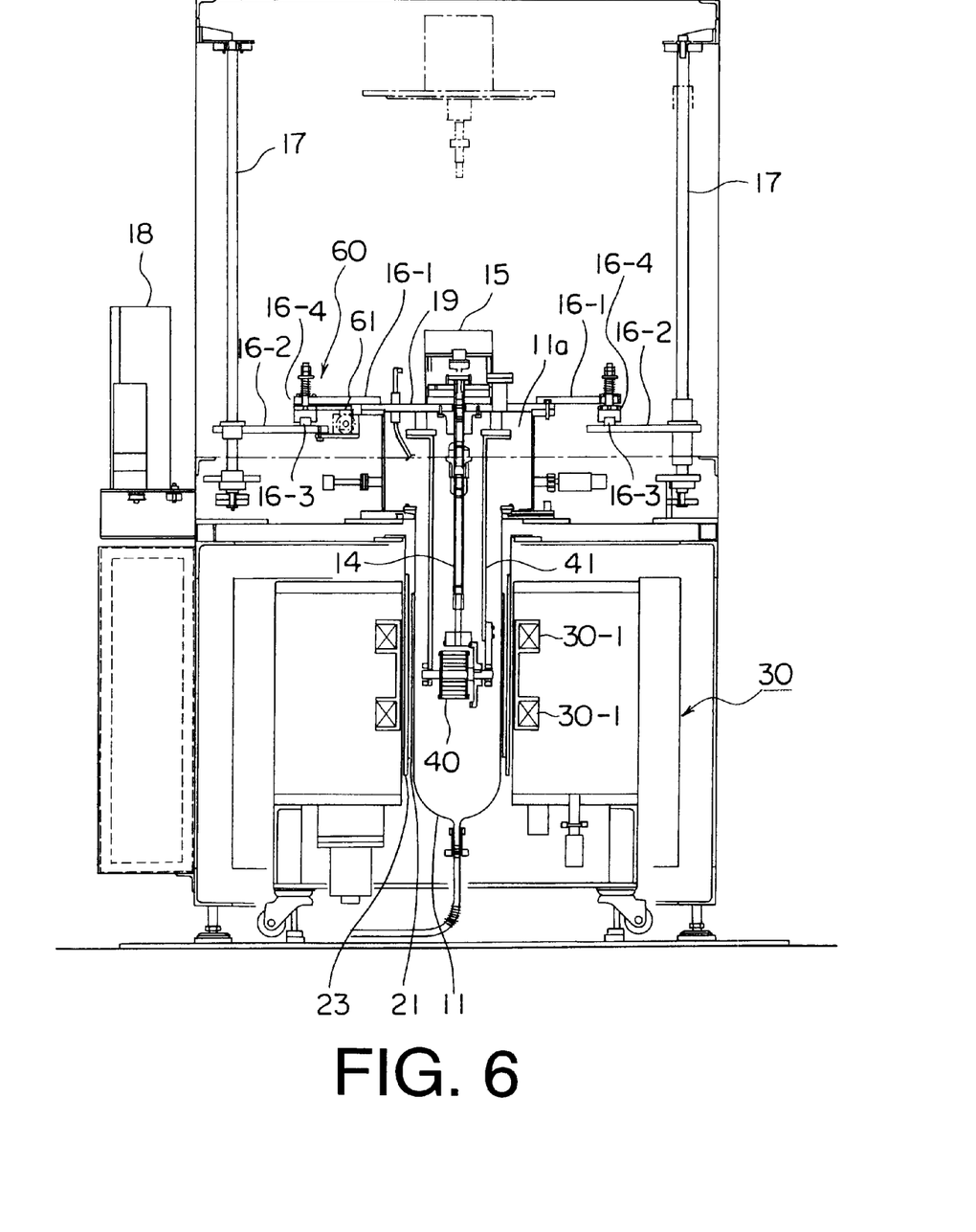
FIG. 6 is a drawing showing the magnetic-field thermal treatment apparatus of FIG. 5 taken from one side portion thereof.

The detailed construction of the second embodiment of the magnetic-field thermal treatment apparatus will be described with reference to FIGS. 5 and 6. The parts identical with those of the embodiment of FIGS. 2 and 3 are designated by the same reference numerals. Referring to FIGS. 5 and 6, the vacuum chamber 11 is provided in a bore of the superconductive magnet unit 30 via the bridge frame 1. The vacuum chamber 11 is provided therein with plural sheets of circular substrates 13 held in the substrate holder 40. The substrates 13 are held in a vertically set state in the substrate holder 40 so that a principal plane of the substrates become parallel to the magnetic field generated by the superconductive magnet unit 30. In this embodiment, the superconductive magnet unit 30 is formed of two superconductive coils 30-1, 30-2. The two superconductive coils 30-1, 30-2 are provided horizontally in a vertically spaced manner so as to surround the vacuum chamber 11. As a result, the superconductive magnet unit 30 exerts the magnetic field in the vertical direction in the interior of the vacuum chamber 11.

As referred to previously, the substrate holder 40 is held in the vacuum chamber 11 via two support members 41 so that the substrate holder can be rotated around horizontal shafts 42. Between the substrate holder 40 and a lower end portion of the rotary shaft 14, the conversion mechanism 50 is provided which is adapted to convert the rotational movement of the rotary shaft 14 into that around the horizontal shafts 42 of the substrate holder 40.

The rotary shaft 14 is drawn out to the exterior of the vacuum chamber 11, and connected to the rotary unit 15 used to rotate the rotary shaft 14. The rotary unit 15 is fixed to the support frame 16. The support frame 16 is screwed at both side portions thereof to the screw shafts 17 via ball screw mechanisms (not shown). The two screw shafts 17 are rendered rotatable by the drive unit 18 via a connecting mechanism. When the screw shafts 17 are rotated, the support frame 16 is rendered vertically movable by the ball screw mechanism.

As described above, the vacuum chamber 11 is provided at an upper end portion thereof with an opening 11a, and the cover member 19 is therefore provided on the support frame 16. The cover member 19 is formed so that the opening 11a of the vacuum chamber 11 can be closed therewith when the substrate holder 40 is set in a predetermined position in the interior of the vacuum chamber 11 by downwardly moving the support frame 16.

The vacuum chamber 11 is connected to the vacuum pumping unit 20. The vacuum pumping unit 20 is provided with a vacuum cryopump 22. Around the vacuum chamber 11, in addition to the heater 21, a water cooled jacket 23 is provided around the heater 21. The water cooled jacket 23 is provided so as to prevent the heat generated by the heater 21 from exerting thermal influence upon the superconductive magnet unit 30.

This embodiment is further provided with a drive unit 60 for moving a combination of the upwardly moved rotary shaft 14, the rotary unit 15 and the substrate holder 40 sideways as shown by one-dot chain lines in FIG. 5. The drive unit 60 is provided so as to easily carry out an operation for the replacement of the substrates 13. The drive unit 60 is formed as follows. The support frame 16 is divided into two, i.e. a pair of first support frame members 16-1 combined with the rotary unit 15, and a pair of second support frame members 16-2 having ball screw mechanisms combined with the screw shafts 17. The second support frame members 16-2 are provided with sideway movement guiding rails 16-3, and the first support frame members 16-1 slide members 16-4 capable of traveling on the rails 16-3. The paired rails 16-3 extend frontward and rearward with respect to a plane of FIG. 6. An air pressure cylinder mechanism 61 for moving sideways the combination of the rotary shaft 14, the rotary unit 15 and the substrate holder 40 together is provided between one first support frame member 16-1 and the relative second support frame member 16-2.

Figure 7:
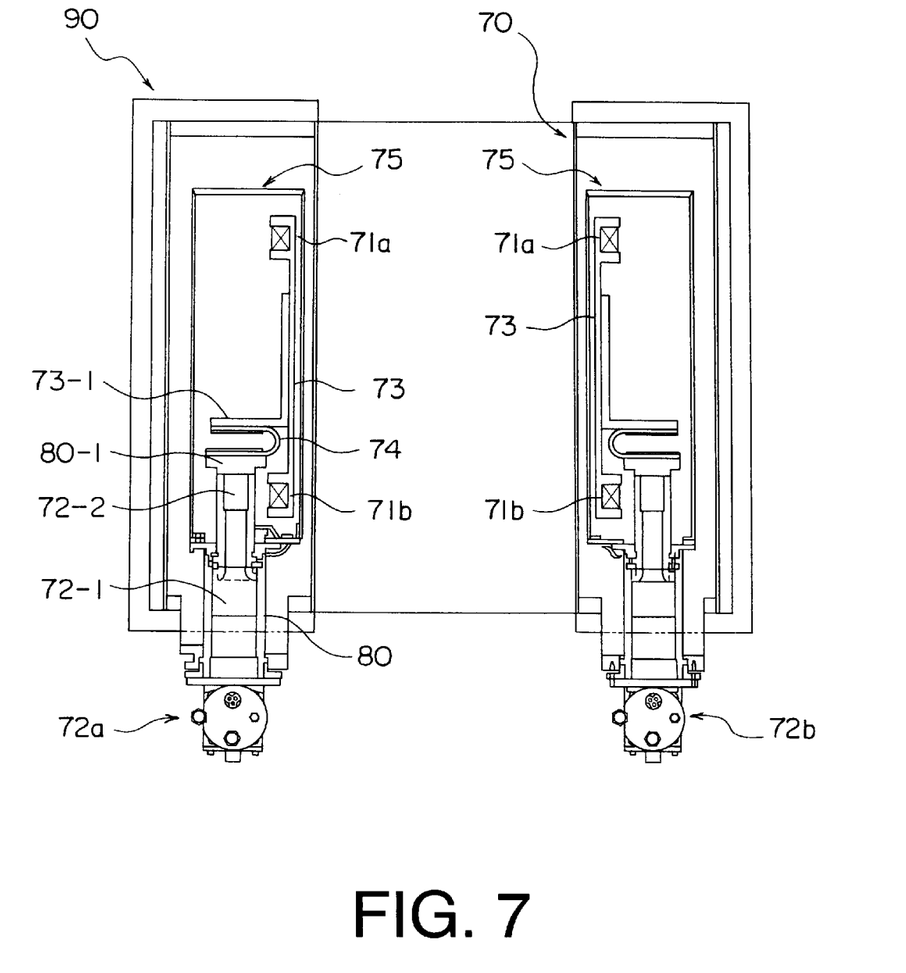
FIG. 7 is a sectional view showing the construction of a solenoid type cryocooler-cooled superconductive magnet unit used in the present invention.

For reference, the cryocooler-cooled superconductive magnet unit proposed by the above-mentioned Japanese Patent Laid-Open (JP-A) No. 114028/2000 will be described briefly with reference to FIG. 7. Referring to FIG. 7, this superconductive magnet unit includes a vacuum chamber or a cryostat 70 of a closed structure in which paired upper and lower superconductive coils 71a, 71b are housed, and two extremely low temperature refrigerators (which will hereinafter be referred to as refrigerators) 72a, 72b inserted from the side of a lower surface of the vacuum chamber 70 thereinto and used to cool the superconductive coils 71a, 71b. One refrigerator is provided in some cases.

A compressor for compressing helium gas and supplying and circulating the resultant gas is connected to the refrigerators 72a, 72b. Simply speaking, the illustrated refrigerators 72a, 72b are provided with motors for switching rotary valves adapted to switch the introduction and discharge of the helium gas from one to the other, and movement conversion mechanisms connected to displacers, and adapted to convert reciprocating movements thereof into rotational movements and set upper and lower limits of the reciprocating movements. Since these parts are disclosed in Japanese Patent Publication (JP-B) No. 53469/1988 as well, the illustration and description thereof will be omitted. The superconductive coils 71a, 71b are supported in the vacuum chamber 70 on coil cooling heat conduction members 73 as winding frames.

The refrigerators 72a, 72b are two-stage refrigerators each of which has a first refrigeration stage 72-1 having a first-stage cold head of 50 K, and a second refrigerant stage 72-2 having a second-stage cold head of 4 K. An inner space, in which the refrigeration stages 72-1, 72-2 are held, of a sleeve 80 is partitioned completely with respect to that of the vacuum chamber 70, and sealed completely with respect to the outside. A front end heat conduction member 80-1 of the sleeve 80 is positioned near a connecting member 73-1 provided on the coil cooling heat conduction member 73. The end heat conduction member 80-1 and connecting member 73-1 are joined together by a flexible multilayer plate type heat conduction member 74. Consequently, the occurrence of stress ascribed to thermal contraction between the coil cooling heat conduction member 73 and sleeve 80 is prevented.

The vacuum chamber 70 has a double cylindrical structure, and the coil cooling heat conduction member 73 is also cylindrically formed. The superconductive coils 71a, 71b are wound around upper and lower portions of the coil cooling heat conduction member 73 so that the coils 71a, 71b become coaxial with a central axis of the vacuum chamber 70. The two superconductive coils 71a, 71b and coil cooling heat conduction member 73 are housed with an upper portion of the sleeve 80 in a double cylindrical type heat radiation shield member 75 provided in the vacuum chamber 70. This heat radiation shield member 75 is a part for preventing the entry of radiation heat. The sleeve 80 extends upward through a bottom portion of the heat radiation shield member 75. The vacuum chamber 70 is provided at an outer circumferential portion thereof with a magnetic shielding member 90, whereby the leakage magnetic field in the circumferential portion of the vacuum chamber can be reduced.

The present invention has been described with respect to two preferred embodiments thereof. The present invention can be applied not only to a magnetic-field thermal treatment for a magnetic resistance effect type head but also to all kinds of material processes in which an object material requires to be thermally treated in the magnetic field is applied thereto.

As described above, the present invention enables a magnetic-field thermal treatment apparatus to be provided which is capable of attaining the reduction of the weight thereof, and, moreover, the reduction of utility consumption, such as amounts of electric power and cooling water used, and an increase in the intensity of generated magnetic field.

What is claimed is:

1. A magnetic-field thermal treatment apparatus adapted to carry out a thermal treatment for object members as a magnetic field is applied to the object members, comprising:
   a depressurized chamber receiving the object members,
   a heater adapted to heat the object members received within the chamber, the heater being disposed around the chamber, and
   a superconductive magnet unit for generating magnetic field,
   the object members formed of plural sheets of substrate-like members being held in a substrate holder and retained in the chamber so that surfaces of the substrates become horizontal, the superconductive magnetic unit having at least one pair of superconductive coils disposed vertically in an opposed state with the chamber therebetween, in such a manner that the magnetic field parallel to the surfaces of the substrate-like members to be treated is exerted on the substrate-like members, the apparatus further comprising a cover member and wherein:

the chamber is formed of a silica tube provided so as to extend vertically and connected to a vacuum pumping system, the chamber operable to be opened and closed at an upper portion thereof by and with the cover member, the cover member being provided with a rotary drive unit having a rotary shaft extending into the interior of the chamber through the cover member, the substrate holder being fixed to the rotary shaft, the apparatus being further provided with a vertical drive unit adapted to move the substrate holder to the exteriorly of the chamber by vertically moving the cover member with the rotary drive unit and the substrate holder.

2. A magnetic-field thermal treatment apparatus adapted to carry out a thermal treatment for object members to be treated as a magnetic field is applied to the object members, comprising:

a depressurized chamber receiving the object members, a heater adapted to heat the object members received within the chamber, the heater being disposed around the chamber, and a superconductive magnet unit for generating magnetic field, the object members formed of plural sheets of substrate-like members being held in a substrate holder and retained in the chamber so that the surfaces of the substrate-like members are disposed in a vertical direction parallel to each other, the superconductive magnet unit having at least one superconductive coil surrounding horizontally around the chamber so that magnetic field parallel to the surfaces of the substrate-like members to be treated is exerted on the substrate-like members.

3. A magnetic-field thermal treatment apparatus according to claim 2, further comprising a cover member and wherein:

the chamber is formed of a silica tube provided so as to extend vertically and connected to a vacuum pumping system, the substrate holder being rotatably supported in the interior of the chamber via horizontal shafts of a support member so that the substrate holder can be rotated around said horizontal shafts, the chamber operative to be opened and closed at an upper portion thereof by and with the cover member, the cover member being provided with a rotary drive unit having a rotary shaft extending through the cover member into the interior of the chamber, a conversion mechanism adapted to convert a rotational movement of the rotary shaft into that of the substrate holder around the horizontal shafts being provided between the substrate holder and a lower end portion of the rotary shaft, a vertical drive unit being provided which is adapted to move the substrate holder exteriorly of the chamber by vertically moving the cover member with the rotary drive unit, the conversion mechanism and the substrate holder.

4. A magnetic-field thermal treatment apparatus according to claim 3, wherein:

two superconductive coils are provided in a vertically spaced manner.

* * * * *